Patented Jan. 31, 1928.

1,657,754

UNITED STATES PATENT OFFICE.

ALPHONS O. JAEGER AND JOHANN A. BERTSCH, OF ST. LOUIS, MISSOURI.

CATALYTIC OXIDATION OF SULPHUR DIOXIDE.

No Drawing.    Application filed February 15, 1926.    Serial No. 88,487.

The present invention relates to improved processes for the catalytic oxidation of sulphur dioxide.

In the past, the only catalyst which has achieved great commercial success in the catalytic oxidation of sulphur dioxide is platinum. While platinum is a very efficient catalyst, from the point-of-view of yield, it is open to numerous disadvantages which are partly of a chemical and partly of a commercial nature. Platinum is a very expensive material and, in fact, a large percentage of the cost of producing sulphuric acid by the contact process is due to the enormous cost of the platinum catalyst. Platinum is also open to other serious disadvantages of a chemical nature. It is exceedingly sensitive to the so-called catalyst poisons such as arsenic, chlorine, and the like. It has also been found necessary in the past to impregnate the platinum containing material into long fiber asbestos or similar carriers, in order to effect a fine sub-division of the catalyst and to increase the surface. As a result, the time required to charge converters is very great, owing to the large amount of hand-labor required in introducing the platinized asbestos into the converter tubes which operation is necessarily carried out by hand.

Despite the disadvantages, platinum hitherto dominated the field as a catalyst for the oxidation of sulphur dioxide. The only other catalyst of the number which have been mentioned in the literature that has had any commercial success is vanadic acid which has been used in the free state or as a vanadate impregnated on carriers such as asbestos, pumice meal, and other finely divided carriers. Vanadic acid, however, when used alone, or in combination with other catalytic compounds, has failed to seriously displace platinum, owing to its sensitiveness against temperature changes, lower efficiency, etc.

It is the object of the present invention to improve the process of catalytic oxidation of sulphur dioxide and to avoid the disadvantages incident to the use of platinized asbestos while retaining high efficiency and other advantages which have made platinum the dominant catalyst hitherto. More particularly, the present invention has for its object the elimination of platinum and the substitution of vanadium compounds and other catalytic compounds without loss of yield and with a notable gain in over-all efficiency.

With these and other objects in view, the present invention contemplates the use, in the catalytic oxidation of sulphur dioxide, of catalysts which consist in base exchange silicates or zeolites which have a chemical structure analogous to the aluminum double silicates or alumino silicates known as natural or artificial zeolites and their dehydration products such as nepheline, leucite, felspar and the like. The catalytic elements such as for example vanadium are incorporated in the zeolites of the present invention in a form in which the elements are not removable by base exchange.

It has been proposed in the past to introdue vanadium into zeolites by a base exchange method and to use the products so produced as catalysts. Vanadium containing zeolites, in which the vanadium is capable of being removed by base exchange, are relatively poor catalysts and are, in general, far inferior to platinum and even in many cases inferior to vanadic acid itself. The present invention, on the contrary, involves the use of an entirely different class of catalytic zeolites in which the catalyst element is combined in such a form as to be impossible of removal by base exchange. The vanadium containing zeolites, referred to above, and which contain the vanadium in a non-exchangeable form, are stable compounds and are preferably prepared by the use of vanadium in a lower stage of oxidation than that which corresponds to vanadic acid, although the invention is not limited to the catalysts which contain the vanadium in the lower stages of oxidation. The preferred vanadium zeolites, in which the vanadium is in a lower stage of oxidation and may be tervalent or quadrivalent, when moistened with mineral acids, give a green or blue color reaction where zeolites which contain pentavalent vanadium in a non-exchangeable form when treated with concentrated hydrochloric acid, give a deep reddish-yellow coloration. The catalysts of the present invention are of high efficiency and the best of the vanadium catalysts show an efficiency equal to and, in some cases, better than the best platinized asbestos catalysts which have been used hitherto.

The novel catalysts of the present invention, therefore, may be considered as more or less hydrated complex compounds of silicic acid and vanadium, or other catalytic elements, and of alkali, alkaline earths, or other metal bases. We do not know the precise form in which the catalytic elements are combined and the present invention is not limited to any particular chemical theory of combination. It seems probable, however, that the catalysts of the present invention, in which the catalytic element is not removable by base exchange, are complex polysilicates in which the catalytic element forms part of a relatively very large molecular complex.

The catalysts of the present invention may contain a single catalytic element in non-exchangeable form or they may contain a mixture of two or more elements. The products may be in the form of crystalline bodies, finely divided precipitates, gels, or gel-like precipitates, opalescent, amorphous, vitreous bodies of extraordinarily, finely porous, honey-comb-like structure. When treated with solutions of alkali or alkaline earth metal compounds, none of the catalytic element is given off in base exchange.

The catalytically active element, such as, for example, vanadium, is present in an exceedingly, finely divided state and combined with a relatively large weight of silic acid or other acids and bases but, despite the fact that the catalytically active base exchange polysilicates have but a small percentage of active catalytic material in a combined and partly shielded form, the catalysts are of extraordinary activity and, in the case of vanadium zeolites, far exceed in their catalytic effectiveness equivalent amounts of free vanadic acid or vanadates. Throughout the specification and claims, the word "zeolite" will be used to include both hydrated polysilicates which readily exchange their bases and also the partially or wholly dehydrated compounds having a structure analogous to nepheline, leucite and felspar and which exchange their bases only slowly but which for the purpose of the present invention are equivalent to the products which exchange their bases with great ease and which are commonly referred to as zeolites.

The vanadium zeolites may also contain small amounts of other elements different from the components of the alkali metal vanadium zeolite. Such elements may be catalytically active or inactive. They may be, for instance, silver, copper, nickel, chromium alkali earth metals and earth metals, which elements can be introduced into the nucleus of the zeolite or by base exchange. Also radicals, such as vanadyl or uranyl may be introduced.

Catalytic zeolites of the present invention can be used alone or in conjunction with inert diluents or carriers, such as pumice, asbestos, kieselguhr, sand, silic acid, porcelain fragments, earthenware fragments, bricks, diamotaceous earth, quartz, rocks rich in quartz, acid resistant minerals, and metal alloys which may advantageously be roughened.

It may be mentioned that diluents as described above can be added either to the liquid components or the zeolites or to their mixture or vice versa. They may also be added to the gels precipitated. Such diluents of siliceous character will be intimately mixed with the zeolites and result to form a solid structure with them by surface silicification. The particle size of such diluents is not restricted in any way and any desired particle size may be used.

Various binders, such as acid or neutral sulphates, chlorides and nitrates of the alkali metals, alkaline earth metals, and the like, may be used. Solutions of water-glass may also be utilized as binding agents.

The catalysts may also be used in combination with known catalysts both platinum and non-platinum, such as iron oxide, or other catalysts.

The catalysts of the present invention are extremely resistant to decomposition by heat and retain their honey-comb-like structure for long periods of time at high temperatures without any noticeable tendency to sintering which has been a serious disadvantage of many of the vanadium catalysts hitherto proposed and which is one of the reasons why they have never been used to the extent to which platinized asbestos has been used. The vanadium zeolites of the present invention and similarly zeolites containing other catalytic elements in non-exchangeable form permit an operating temperature, even up to 580° C. or above and stand up for a very long time under these temperatures. The reaction velocity at such high temperatures is very considerably greater than at the lower temperatures which have hitherto been generally used and the possibility of increasing the yield by more rapid catalysis at higher temperatures constitutes one of the advantages of the present invention.

Many of the catalytically active zeolites of the present invention in which the catalytic elements are present in non-exchangeable form are, in themselves, new chemical products but we do not in this application claim these catalysts as new chemical compounds, this being the subject-matter of our co-pending application, Serial No. 100,116, filed April 6, 1926, and, on the contrary, the present application is limited to processes of oxidizing sulphur dioxide catalytically in which processes catalytically active zeolites are used which contain catalytic elements in a non-exchangeable form.

The invention will be described more fully in the following specific examples which set forth the oxidation of sulphur dioxide or of gases containing sulphur dioxide in the presence of a number of representative catalysts embodying the present invention. It should be clearly understood that these examples, in no sense, limit the invention, but, on the contrary, are illustrations of processes embodying the improvements of the present invention.

*Example 1.*

2.2 parts of ammonium vanadate are mixed with a mixture containing about .77 parts of NaOH in 25 parts of water and the mixture is boiled until the odor of ammonia ceases to be perceptible. The mixture is then neutralized with dilute hydrochloric acid until it turns reddish-yellow. About 65 parts of water are added to dilute the solution to which about 9.7 parts of water-glass of 38° Bé. and an equal amount of water are then added under constant stirring. The stirring is continued and the mixture is gradually warmed up to about 65° C. at which point the solution first becomes colorless and then a gradually increasing granular gel-like precipitate falls. During the precipitation, dilute hydrochloric acid is added in small portions from time to time which results in the solution temporarily becoming reddish-yellow, which color, however, soon disappears. The operation is continued until the reaction of the dispersing agent is still slightly alkaline to litmus. The gel-like precipitate is separated from the solution and after drying it at a temperature below 100° C. the colorless mass is broken into pieces about the size of a pea.

Instead of using the above described vanadium zeolite alone, it may be used with acid resistant carriers such as finely powdered sand, rocks rich in quartz, powdered glass, pumice meal, asbestos meal, fibres, kieselguhr, silicic acid, and the like. Preferably, the mixture is effected by kneading the diluent carriers with the moist curdy precipitate of the vanadium zeolite and pressing the mixture into tablets or fragments.

The gel or dried vanadium zeolite in finely ground condition may also be applied in the form of a thin layer on coarsely granular carriers, such as fragments of pumice, diatomaceous earth, filter stones, quartz, acid resistant minerals, or rocks, or sulphates of the alkali or alkaline earth metals. If necessary, acid or neutral sulphates, chlorides or nitrates of metals, water-glass, alkali metal or alkaline earth metal lyes or concentrated phosphoric acid may be used as cementing agents.

The diluted contact masses are treated in the same way as described in the case of the undiluted catalysts. In some cases, it may be desirable to partly or wholly dehydrate the vanadium zeolites.

The vanadium zeolites are filled into a sulphur dioxide converter and burner gases passed therethrough at 430–450° C. In a short time the sulphur dioxide begins to be transformed into sulphur trioxide with good yields. The contact masses retain their activity even up to 600° C.

*Example 2.*

2 parts of ammonium vanadate are suspended in about 20 parts of water and are gradually dissolved by the addition of about one part of potassium hydroxide. The mixture is boiled until the ammonia has completely disappeared and is then cooled down to room temperature and neutralized with dilute hydrochloric or sulphuric acid until neutral to litmus. The resulting red-yellow solution is diluted with water to about 70 parts, whereupon 7 parts of 38° Bé. water-glass solution, previously diluted with 10 parts of water, is introduced in a thin stream with vigorous agitation.

The base exchanging vanadium polysilicate is precipitated out by a cautious heating to 60–70° C. with thorough agitation and the addition of small amounts of dilute hydrochloric acid which first causes the solution to become slightly red and finally entirely colorless and then brings about the precipitation in the form of a granular precipitate. Care should be taken to permit the solution to remain slightly alkaline. The curdy precipitate is then freed from liquid by pressing.

After hydrating in the usual manner, a 10% solution of copper sulphate is permitted to trickle over the product until no further base exchange takes place. The cuprovanadium zeolite thus produced is first carefully dried at a temperature below 100° C. and then calcined in a stream of air at 460° C., whereupon it is treated with gases containing sulphur dioxide and oxygen at a temperature of 450–500° C.

The catalysts are introduced into a converter and give a good yield of sulphur dioxide at temperatures of 430–460° C. when a 7% burner gas is used at ordinary velocities even if the burner gas contains small amounts of hydrochloric acid.

Instead of using a copper sulphate solution to effect base exchange, calcium chloride, ferric sulphate, or nickel, cobalt, or silver nitrate solution, may be used, or a solution containing a mixture of two or more of these salts may be employed.

Instead of using the catalysts alone in a converter, they may be advantageously diluted with catalytically active or inactive carriers, or may be coated on them as described in connection with Example 1. The

Example 3.

8.1 parts of finely pulverized $V_2O_5$ is gradually dissolved in a solution of 5.15 parts of KOH in 300 parts of water. If the material does not completely dissolve, a small amount of chlorine may be passed in to complete the solution. Dilute hydrochloric acid is added until the solution is neutral to litmus. The reddish-yellow solution is then diluted with 1200 parts of water and 140 parts of potassium silicate, containing 20.95% ($SiO_2$) and 9.5% $K_2O$, are added and 60 parts of kieselguhr and 10 parts of asbestos fibers are stirred into the solution.

The mixture is then gradually warmed with vigorous agitation to about 60–70° C. and dilute hydrochloric acid is gradually added in small portions until the dispersing agent is only weakly alkaline. The thorough mixture of zeolite and carrier is then pressed lightly to remove some of the water, dried until moist, and compressed into granules. The granules are first heated to 300–400° C. in a stream of air and then are exposed to dilute burner gases at 400–450° C., whereupon the contact mass is ready for use.

200 l. of the contact masses above described can be used with a loading of 150–200 cubic meters of 7% burner gas per hour at a temperature of about 450° C.

The broken fragments of the vanadium zeolites diluted with carriers may be treated with copper sulphate, ferric chloride, cobalt sulphate, and the like, in the manner described in connection with Example 2 and, by this means, they can be transformed into other highly active and durable contact masses.

A further efficient modification consists in the cementing of the curdy vanadium polysilicate onto granular or roughened carriers as described in Example 1, or the diluted dry vanadium polysilicate may be pulverized and cemented onto granular carriers by means of various cementing materials as also described in Example 1. A further modification consists in more or less completely dehydrating the vanadium silicates described above.

Example 4.

A mixture of 0.42 parts of potassium tungstate and 3 parts potassium metavanadate is prepared by dissolving up correspond amounts of vanadic acid and tungstic acid with potassium hydroxide in about 45 parts of water. The solution is then neutralized with dilute hydrochloric acid and 8 parts of a 38° Bé. water-glass solution is added. The solution is gently warmed and 4.5 parts of celite or 8 parts sand are added and the suspension is treated from time to time with small portions of dilute hydrochloric acid until the dispersing agent is just alkaline.

The mixture which contains the zeolite is a thickly gelatinous mass and is kneaded with a further amount of 5.5 parts of celite or 16 parts of sand, dried and formed into granules. The celite may also be impregnated with solutions of metal salts whose bases possess weakly catalytic powers, such as, for example, ferric sulphate, nickel sulphate, copper sulphate, silver nitrate, cobalt sulphate, etc.

A second modification of the process consists in rolling quartz nuggets, quartz filter stones, or roasted pyrites with the thickly gelatinous mass containing the zeolite as in Example 3 which results in coating the carriers with the contact mass.

The granular catalysts, after drying may be treated with dilute burner gases at 430–460° C., and then with 7% burner gases, an effective contact sulphuric acid process setting in. The contact masses show good resistance to high temperatures.

It is advantageous in certain cases to heat the contact masses before use in order to remove water of hydration or crystallization. This process does not change the physical structure of the catalysts which makes them so well fitted for catalytic purposes. The catalytic power remains substantially undiminished.

Example 5.

A mixture of 3.65 parts of $V_2O_5$, 9.66 parts of finely pulverized silica, 1.85 parts 90% KOH, 10 parts $K_2CO_3$, and 33.8 parts of borax are melted together at a red heat until the evolution of $CO_2$ ceases and the melt appears homogeneous. The melt is then poured into water and leached with running water until the leach water ceases to show the presence of boric acid. The wash water carries only traces of vanadium and removes the excess of boric acid which is not chemically combined.

The product is in the form of small hard granules which receive a preliminary treatment with dilute $SO_2$ and the contact mass is then ready for use as a sulphuric acid catalyst and gives an excellent yield of $SO_3$ from 7% burner gases.

Other efficient contact masses can be prepared by introducing other catalytically active elements into the zeolite through base exchange as has been described in previous examples.

Example 6.

1 mol of $V_2O_5$ is mixed into paste with concentrated sulphuric acid and is heated with the addition of small amounts of water. A rapid stream of $SO_2$ is passed through the hot fluid until a perfectly clear blue solution is produced. The excess $SO_2$ is removed by boiling the solution with a potassium hydroxide solution until the brown precipitate, which forms at first, is completely dissolved to a clear dark-brown solution.

4 mols of $SiO_2$, in the form of potassium silicate, are diluted with 5 times the amount of water and 3 mols of $SiO_2$, in the form of hydrated silicic acid, are added. The mixture is then poured into the vanadite solution with vigorous agitation. The mixture is heated to about 65° C. and a jelly-like precipitate forms and is gradually transformed into a granular mass which is readily filtered. Most of the liquid is removed by pressing and the precipitate is thoroughly washed with water until the wash water gives practically no test for vanadium. The product is then dried at a temperature below 100° C.

The zeolite thus produced, when broken into fragments, is an excellent contact mass for the production of sulphur trioxide and gives good yields. The zeolite may be hydrated in the usual way and then treated with solutions of silver nitrate, ferric sulphate, copper sulphate, calcium chloride, and the like, in order to effect a base exchange. These contact masses containing other catalytic elements in exchangeable form are very efficient and are practically completely insensitive to catalyst poisons.

Example 7.

3 solutions are prepared:
(1) 1 mol of ammonium vanadate is treated with sulphur dioxide in an aqueous suspenson and is thus transformed into the water soluble greenish-blue vanadite. The excess sulphur dioxide is then removed by boiling.
(2) 1 mol of copper sulphate in a water solution is treated with a sufficient amount of ammonia to form the deep blue cuprammonium sulphate.
(3) 10 mols of $SiO_2$ in the form of a potassium silicate solution are diluted with 10 times the amount of water and mixed with a mixture of equal parts of iron oxide and celite until the suspension remains just fluid.

Solutions 1, 2 and 3 are brought together with vigorous agitation and heated to 65° C. A jelly-like precipitate first forms which becomes granular and is pressed to remove excess liquid, thoroughly washed and dried. The product is a sodium-vanadyl-copper-zeolite.

If desired, this product can be treated with metal salt solutions, either directly or after hydrating, in order to effect a base exchange. The product with or without the addition of catalyst elements, through base exchange, is an excellent catalyst for the production of sulphur trioxide.

Example 8.

The three following mixtures are prepared:
(1) 16.2 parts of $V_2O_5$ and 10.2 parts 100% KOH are brought into solution in 300 parts of water, heated to boiling, and a rapid stream of sulphur dioxide is passed through until the color of the solution changes first to green and finally to blue and potassium vanadyl sulphate partially precipitates out as a bluish-white precipitate. Excess $SO_2$ is removed by boiling and potassium hydroxide is cautiously added until the precipitate dissolves up to a clear brown solution of the vanadite.
(2) 10 parts of chrome alum are treated with just enough postassium hydroxide until it just dissolves up to a clear solution.
(3) 160 parts of potassium silicate of 39° Bé. are diluted with 1000 parts of water and 80 parts of celite are stirred in.

Solutions 1 and 2 are poured in rapid succession into mixture 3 and gently warmed with vigorous agitation. The mass first solidifies to a gel and, on further stirring, forms granular readily filterable aggregates. The mixture is allowed to stand decanted, the precipitate pressed out and washed with cold water until the filtrate is colorless. The press-cake is then dried at temperatures under 100° C.

The diluted postassium-chromium-vanadium-zeolite is broken into fragments and can be directly used as a catalyst in the production of sulphur trioxide. When burner gases are passed through with the usual velocity, at temperatures of 400–500° C., the contact process rapidly commences and good yields are obtained.

The postassium-chromium-vanadium-zeolite may be hydrated and treated with solutions, such as silver nitrate, copper sulphate, nickel nitrate, ferric chloride, cobalt nitrate, etc., or other mixtures, in order to introduce the corresponding bases into the zeolite by base exchange. Different solutions may also be used successively instead of simultaneously. The products produced are excellent catalysts for the contact process of oxidizing sulphur dioxide.

Example 9.

The following mixtures are prepared:
(1) 1 mol of $V_2O_5$ is stirred with a paste with a small amount of concentrated sulphuric acid. Small amounts of water are added and the mixture is heated while a rapid stream of sulphur dioxide is passed through until a completely clear blue solution results. Instead of sulphur dioxide, other reducing agents, such as hydrogen, nitrous acid, hydrogen sulphide, hydrogen chloride, oxalic acid, citric acid, tartaric acid, sugar, ethyl alcohol, methyl alcohol, formaldehyde, and the like, may be used.

(2) 1 mol of potassium alum is dissolved in water and is precipitated at boiling temperature, pressed hot, and the aluminum hydroxide produced dissolved up with a minimum amount of potassium hydroxide.

(3) 10 mols of $SiO_2$, in the form of potassium silicate, are diluted with 5 times the amount of water and sand, or quartz powder is added until the mass can just be stirred.

Solutions 1 and 2 are poured into 3 and the mixture heated to 65° C. with thorough agitation. A gel first forms which then changes into a granular mass which is easily filtered. The precipitate is pressed, thoroughly washed with water until the wash water is practically free from vanadium and dried at temperatures below 100° C. The contact mass is an excellent catalyst for sulphur trioxide.

The zeolite can be treated with metal salt solutions, in order to effect base exchange as has been described in connection with other examples. The introduction of silver, iron, copper, nickel, calcium or barium, by base exchange, improves the effectiveness of the zeolite as a catalyst in the contact sulphuric acid process.

The above described examples set forth representative zeolites in which catalytically active elements are present in a non-exchangeable form. It will be clear to those skilled in the art that many other combinations of catalytic elements in zeolites can be formed and it is intended that the present invention shall include the processes of oxidizing sulphur dioxide in the presence of zeolite catalysts containing catalytic elements combined in a non-exchangeable form.

As has been pointed out before, we do not know the reason why the relatively exceedingly small amounts of catalytic elements combined in zeolites, in which combination they would naturally be expected to be relatively inefficient, possess such remarkable catalytic power. Probably, this remarkable and unexpected effect is due to a number of causes, although the invention is not limited to any theory as to why the effects are brought about. It seems probable, however, that the finely porous, honey-comb-like structure of the zeolites in which the porosity is in many cases sub-micronic, not only presents the catalyst in a very finely and evenly divided form with enormous surface extensions, but the gas pressure in the fine pores, having average diameters of considerably less than one micron, in many cases, is probably enormously increased due to the high surface energy and it is probable that this results in a greater reaction speed in accordance with mass law. We are also of the opinion that the radical $SiO_2$, particularly in such hydrated polysilicates as zeolites, is a positive activator of the catalysts.

During the process of oxidation of sulphur dioxide to sulphur trioxide, the zeolite catalysts of the present invention may undergo surface changes without affecting their catalytic activity seriously if at all. It is also possible to effect surface changes on the zeolite catalysts by a suitable preliminary treatment before using them in the catalytic process. Such surface changes which may, for example, consist in a partial silicification of the surface of the zeolites may be desirable in some cases where, for example, the mechanical strength of the zeolite is insufficient for the purposes for which it is to be used. Zeolites embodying the features of the present invention which have suffered surface alterations either by a silicification treatment before use or as an effect of the catalytic process in which they are employed are included in the present invention which is in no sense limited to zeolites having the same zeolite structure throughout the whole of their mass.

We claim:

1. The process of catalytically oxidizing sulphur dioxide which comprises passing gases containing sulphur dioxide and oxygen at an elevated temperature over catalysts containing zeolites in which at least one catalytically active element is combined in a non-exchangeable form.

2. The process of catalytically oxidizing sulphur dioxide which comprises passing gases containing sulphur dioxide and oxygen at an elevated temperature over catalysts containing zeolites in which at least one catalytically active element of the fifth, sixth and seventh groups of the periodic system is combined in a non-exchangeable form.

3. The process of catalytically oxidizing sulphur dioxide which comprises passing gases containing sulphur dioxide and oxygen at an elevated temperature over catalysts containing zeolites in which vanadium is combined in a non-exchangeable form.

4. The process of catalytically oxidizing sulphur dioxide which comprises passing gases containing sulphur dioxide and oxygen at an elevated temperature over catalysts containing zeolites in which vanadium in a stage of oxidation lower than that corresponding to vanadic acid is combined in a non-exchangeable form.

5. The process of catalytically oxidizing sulphur dioxide which comprises passing gases containing sulphur dioxide and oxygen at an elevated temperature over catalysts containing pseudomorphous dehydrated zeolites in which at least one catalytically active element is combined in a non-exchangeable form.

6. The process of catalytically oxidizing sulphur dioxide which comprises passing gases containing sulphur dioxide and oxygen at an elevated temperature over catalysts containing pseudomorphous dehydrated zeolites in which vanadium is combined in a non-exchangeable form.

7. The process of catalytically oxidizing sulphur dioxide which comprises passing gases containing sulphur dioxide and oxygen at temperatures above those at which ordinary platinum free non-zeolite vanadium catalysts are rapidly deteriorated but not materially exceeding 600° C. over catalysts containing zeolites in which at least one catalytically active element is combined in a non-exchangeable form.

8. The process of catalytically oxidizing sulphur dioxide which comprises passing gases containing sulphur dioxide and oxygen at temperatures above those at which ordinary platinum free non-zeolite vanadium catalysts are rapidly deteriorated but not materially exceeding 600° C. over catalysts containing zeolites in which vanadium is combined in a non-exchangeable form.

9. The process of catalytically oxidizing sulphur dioxide which comprises passing gases containing sulphur dioxide and oxygen at an elevated temperature over catalysts comprising zeolites containing catalytically active bases in exchangeable form, and in which at least one catalytically active element is combined in a non-exchangeable form.

10. The process of catalytically oxidizing sulphur dioxide which comprises passing gases containing sulphur dioxide and oxygen at an elevated temperature over catalysts comprising zeolites containing catalytically active bases in exchangeable form, and in which at least one catalytically active element of the fifth, sixth and seventh groups of the periodic system is combined in a non-exchangeable form.

11. The process of catalytically oxidizing sulphur dioxide which comprises passing gases containing sulphur dioxide and oxygen at an elevated temperature over catalysts comprising zeolites containing catalytically active bases in exchangeable form, and in which vanadium is combined in a non-exchangeable form.

12. The process of catalytically oxidizing sulphur dioxide which comprises passing gases containing sulphur dioxide and oxygen at an elevated temperature over catalysts comprising zeolites containing catalytically active bases in exchangeable form, and in which vanadium in a stage of oxidation lower than that corresponding to vanadic acid is combined in a non-exchangeable form.

13. The process of catalytically oxidizing sulphur dioxide which comprises passing gases containing sulphur dioxide and oxygen at an elevated temperature over catalysts containing zeolites, in which at least one catalytically active element is combined in non-exchangeable form and which zeolites are combined with inert carriers to form a homogeneous unitary structure.

14. The process of catalytically oxidizing sulphur dioxide which comprises passing gases containing sulphur dioxide and oxygen at an elevated temperature over catalysts containing zeolites in which vanadium is combined in non-exchangeable form and which zeolites are combied with inert carriers to form a physically homogeneous unitary structure.

15. The process according to claim 13 in which at least part of the inert carriers are finely divided.

16. The process according to claim 13, in which at least part of the carriers are finely divided and of microporous structure.

17. The process according to claim 13, in which part at least of the inert carrier particles are kieselguhr particles.

18. The process according to claim 13, in which the catalytically active zeolite is coated onto massive carrier fragments.

19. The process according to claim 14, in which at least part of the inert carriers are finely divided.

20. The process according to claim 14, in which at least part of the carriers are finely divided and of microporous structure.

Signed at St. Louis, Missouri, this 11th day of February 1926.

ALPHONS O. JAEGER.
JOHANN A. BERTSCH.